United States Patent [19]

Nickl

[11] 4,093,865

[45] June 6, 1978

[54] CODE SYMBOL SCANNER USING A DOUBLE X BAR PATTERN

[75] Inventor: Franklyn George Nickl, San Jose, Calif.

[73] Assignee: National Semiconductor Corporation, Santa Clara, Calif.

[21] Appl. No.: 792,393

[22] Filed: Apr. 29, 1977

[51] Int. Cl.² .............................................. G06K 7/10
[52] U.S. Cl. .............................. 250/566; 340/146.3 F; 235/470; 350/6; 350/7
[58] Field of Search ............... 350/6, 7, 285; 250/566, 250/568; 340/146.3 F, 146.3 G, 146.3 Z, 146.3 AH; 235/61.11 E

[56] References Cited

U.S. PATENT DOCUMENTS

| | | | |
|---|---|---|---|
| 3,594,578 | 7/1971 | Ohman | 350/6 |
| 4,006,343 | 2/1977 | Izura | 340/146.3 F |
| 4,041,322 | 8/1977 | Hagosh | 250/568 |

*Primary Examiner*—David C. Nelms
*Assistant Examiner*—Michael J. Tokar
*Attorney, Agent, or Firm*—Brown & Martin

[57] ABSTRACT

A system for scanning a code symbol consisting of a combination of spaced parallel bars affixed to an object for providing coded information related to the object. A flat panel defines a scanning region adjacent the panel for receiving objects having the code symbol. Light transmissive areas in the panel surface define a "double X bar" pattern consisting of a predetermined configuration of five bars, such as shown in the Drawing. A laser beam is sequentially scanned at an acute angle to the panel surface in planes extending through the five bars into the defined scanning region at prescribed angles in relation to a first direction. When a received object containing said code symbol is moved within the defined scanning region from the first direction with the code symbol facing the panel or facing within almost ninety degrees of a second direction, opposite to the first direction, light scanned into the defined scanning region is reflected by the code symbol to a detection system, and the detection system provides an electrical signal indicative of the coded information.

23 Claims, 11 Drawing Figures

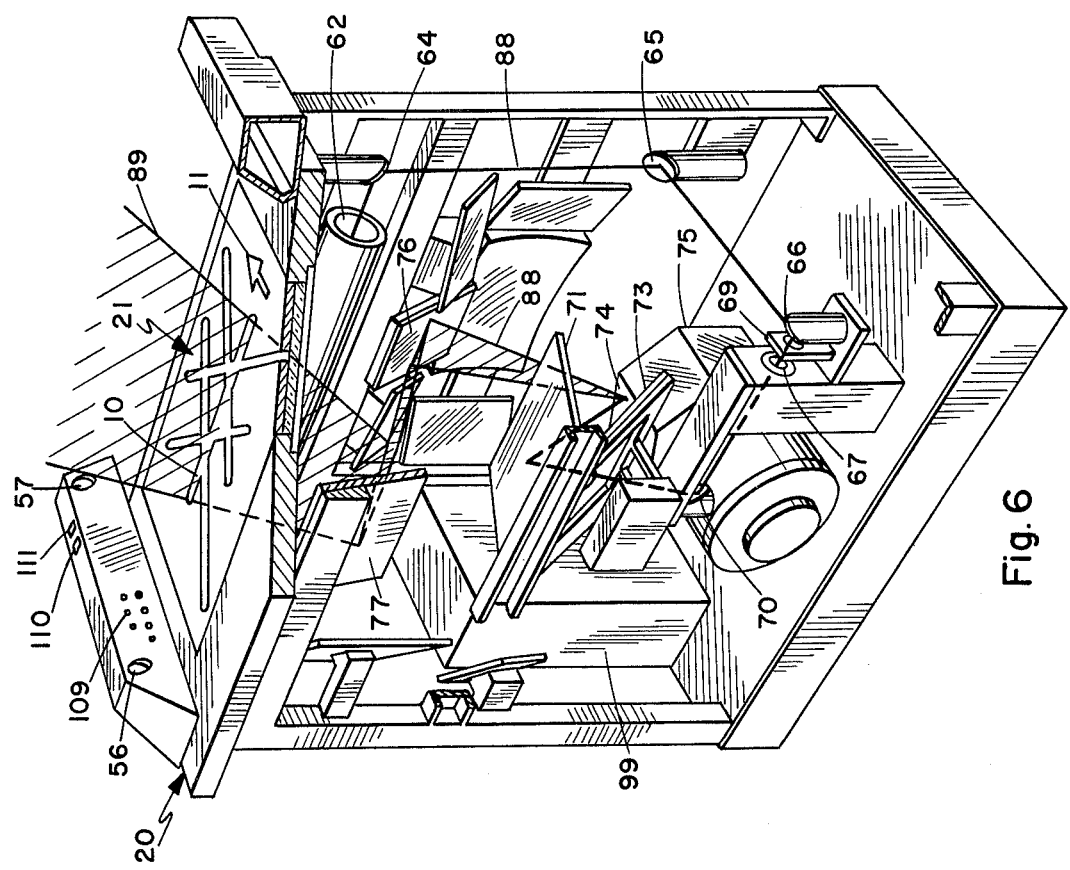

CODE SYMBOL SCANNER USING A DOUBLE X BAR PATTERN

BACKGROUND OF THE INVENTION

The present invention generally pertains to optical scanning systems and is particularly directed to a scanning system for scanning a code symbol consisting of a combination of spaced parallel bars affixed to an object for providing coded information related to the object.

A typical scanning system of this type includes a housing and/or a panel for defining a scanning region adjacent the housing or panel for receiving objects having the code symbol, a light source, such as a laser, for providing a light beam; an optical system for scanning the light beam in a predetermined pattern throughout the defined scanning region; and a detection system for detecting light having at least a predetermined intensity reflected from the code symbol and for providing an electrical signal in response to detection of such reflected light; and an optical system for directing light from the scanned light beam that is reflected from the code symbol on a received object to the detection system.

These systems are useful in reading bar code symbols such as the Universal Product Code (UPC) code symbols that are affixed to many packaged grocery items. UPC code symbols consist of parallel bars having various widths and spacings. The electrical signals provided by the detection system in response to scanning the code symbol are provided to a data processing system which provides various functions in relation to the information represented by the electrical signal, such as registering and displaying the price of the item bearing the code symbol and adjusting inventory records concerning such items.

An important consideration in using scanning systems of this type is the orientation of the code symbol within the scanning region defined by the panel so as to enable the full code symbol to be scanned by the light beam. In many prior art scanning systems the code symbol must be precisely oriented within the defined scanning region in relation to the panel. The time consumed in precisely aligning the code symbol delays the scanning of a large number of items. This is a distinct disadvantage to using such a scanning system in locations such as a supermarket checkout counter where it is desirable to scan a large number of code symbols rapidly. Although there are some prior art systems that do not require precise orientation, these systems have not proven to be wholly satisfactory because of various problems, such as there being holes in the scanning pattern, the depth of field in which the object must be received being shallow, and/or the orientation being limited to a relatively small angle in relation to a given direction.

In one prior system that does not require precise orientation, the panel which defines the scanning region for receiving objects bearing a code symbol includes light transmissive areas defining a "bar X" scanning pattern. The "bar X" pattern includes a first bar extending normal to a first direction and second and third bars intersecting with each other to define an "X" pattern. The "X" pattern is disposed symmetrically in relation to the first bar and is positioned in a second direction opposite the first direction from the first bar.

The light beam is scanned in a pattern consisting of a first plane extending through the first bar into the defined scanning region at an acute angle to the panel surface in the first direction, a second plane extending through the second bar into the defined scanning region at an acute angle to the panel surface and at an acute angle to the first direction, and a third plane extending through the third bar into the defined scanning region at an acute angle to the panel surface and at an acute angle to the first direction.

The bar X scanner is capable of accurately scanning UPC code symbols, but is somewhat limited in the range of orientation with which the object bearing the code symbol can be received in the defined scanning region. Although packages having the code symbol on the bottom can be moved quickly through the defined scanning region when the code symbol faces the panel surface no matter how the sides of the package are oriented in relation to the second direction, packages having the code symbol on the side must be more carefully oriented. So long as the spaced parallel bars of a code symbol positioned on a side of a package are vertical when the package is upright, the package can be received in the defined scanning region in a generally upright orientation, with the only concern for positioning being whether the code symbol is generally facing the second direction. However, on some packages the spaced parallel bars of the code symbol are horizontal when the package is upright, whereby the package must be tilted from an upright position when it is moved through the defined scanning region, as well as being oriented to be generally facing the second direction. The different orientations required for packages having vertical vis-a-vis horizontal spaced bar code symbols delays the process of moving the packages through the defined scanning region.

Another prior art system that does not require precise orientation is the so-called Sweda system manufactured by Litton Systems, Inc. This scanning system purportedly is omnidirectional in that the object bearing the code symbol can be oriented in any direction as it is received in the defined scanning region. However, the Sweda system has some "holes" in its scanning pattern where the code symbol cannot be read in certain orientations. Also the depth of field of the Sweda system is such that the code symbol must be received within about 2 to 3 inches of the panel surface. In addition the Sweda system has difficulty in reading symbols with horizontal bars on the side of the received object unless the object is tilted.

Still another prior art system not requiring precise orientation is that which was marketed by Coherent Radiation of Palo Alto, Calif., and was known as the "Coherent Eye". In such a system a light beam is scanned at an acute angle to a reference plane defining a boundary of the scanning region in which the object bearing the code symbol is received. The light beam is scanned in a pattern consisting of a plurality of at least three sets of parallel planes, wherein the different sets intersect with one another. Each scanned plane of light extends into the scanning region normal to the reference plane. The scanning pattern that is impinged upon an object moving through the scanning region is effectively a plurality of adjacent interlocking triangles. Although such system does not require that the object bearing the code symbol be precisely located within the scanning region, if the parallel bars of the code symbol are normal to the reference plane, the code symbol must be oriented to face within a relatively narrow angle of a given scanning direction.

SUMMARY AND OBJECTS OF THE INVENTION

The code symbol scanner of the present invention is characterized by the scanning system including an optical system for scanning the light beam at an actute angle to a reference plane defining a boundary of the defined scanning region and in a unique scanning pattern within the defined scanning region. Within the reference plane, the scanning pattern is a "double X bar" pattern.

Referring to FIG. 1, the double X bar pattern essentially includes a first bar 10 in the reference plane extending normal to a first direction 11; second and third bars 12, 14 in the reference plane disposed along (imaginary) lines that intersect with each other and disposed symmetrically in relation to the first bar 10; and fourth and fifth bars 17, 19 in the reference plane disposed along (imaginary) lines that intersect with each other and disposed symmetrically in relation to the first bar 10; wherein the second and third bars 12, 14 intersect with each other and/or the fourth and fifth bars 17, 19 intersect with each other; and wherein the second bar 12 intersects with the fifth bar 19 and the third bar 14 intersects with the fourth bar 17.

The predetermined scanning pattern further includes a first plane extending through the first bar 10 into the defined scanning region at an acute angle to the reference plane in the first direction 11, a second plane extending through the second bar 12 into the defined scanning region at an acute angle to the reference plane at an acute angle to the first direction 11, a third plane extending through the third bar 14 into the defined scanning region at an acute angle to the reference plane and at an acute angle to the first direction 11, a fourth plane extending through the fourth bar 17 into the defined scanning region normal to the reference plane and at an acute angle to the first direction 11, and a fifth plane extending through the fifth bar 19 into the defined scanning region normal to the reference plane and at an acute angle to the first direction 11.

In the preferred embodiment of the double X bar scanner of the present invention, the acute angle to the first direction 11 at which the second, third, fourth and fifth planes respectively extend is approximately 45°. It also is preferrable that the acute angle to the reference plane at which the first plane extends is 45° plus or minus 15°; that the acute angle to the reference plane at which the second and third planes extend is 45° plus or minus 15°; and that the acute angle to the reference plane at which the light beam is scanned in the fourth and fifth planes is 45° plus or minus 15°.

Accordingly, when a received object containing an UPC code symbol is received within the defined scanning region from the first direction with the code symbol facing the panel or facing within almost 90° of a second direction 16 opposite the first direction 11, light scanned into the defined scanning region by the scanning system is reflected by the code symbol to the detection system, and the detection system provides an electrical signal indicative of the coded information.

Thus, the double X bar scanner of the present invention is capable of scanning code symbols within a broad range of orientation. A code symbol on the side of the package with the spaced parallel bars of the code symbol vertical when the package is upright is accurately scanned by those light beams extending through the first second and third bars when the package is in the upright position with respect to a horizontal panel surface. A code symbol on the side of the package with the spaced parallel bars of the code symbol horizontal when the package is upright is accurately scanned by those light beams extending through the fourth and fifth bars when the package is in the upright position. Also, since the range of orientation with respect to the second direction is approximately 90°, a total range of almost 180° is thereby provided.

Thus a clerk can move all packages through the defined scanning region with generally the same degree of upright orientation, thereby improving the scanning speed for a large number of objects bearing code symbols.

Also with a double X bar scanning system the depth of field is approximately 3½ inches (9 cm). Accordingly, when the code symbol is on the side of a package and within approximately 3½ inches of the end of the package facing the panel the package can be received in an upright position, and need not be turned on its side so as to place the code symbol within the field depth of the scanner.

To provide a compact scanning region, it is preferred that the first bar 10 intersect with the second, third, fourth and fifth bars 12, 14, 17, 19, wherein the point of intersection 15 between the second and third bars 12, 14 is in the second direction 16 from the first bar 10 and/or the point of intersection 18 between the fourth and fifth bars 17, 19 is in the first direction 11 from the first bar 10.

It is also preferred that the ends of the second, third, fourth and fifth bars 12, 14, 17, 19, in the first direction 11 from the first bar 10 are approximately equidistant in the first direction 11 from a straight (imaginary) line extending along and beyond the length of the first bar 10 and the ends of the fourth and fifth bars 17, 19 in the second direction 16 from the first bar 10 are approximately twice the distance in the second direction 16 from the straight line along the length of the first bar 10 as the ends of the second and third bars 12, 14 in the second direction 16 from the straight line. This feature enables the full depth of field for scanning the code symbol to be provided over a wider range in the direction parallel to the first bar 10.

Other features of the double X bar scanner of the present invention are discussed in relation to the description of the preferred embodiment.

BRIEF DESCRIPTION OF THE DRAWING

FIG. 5 is a perspective view from another direction of the double X bar scanner with a portion of the housing cut away to show additional portions of the optical system.

FIG. 6 is a view of the scanner as shown in FIG. 3 and additionally showing the optical path of the light beam scanned in a plane extending through the first bar into the defined scanning region.

DESCRIPTION OF THE PREFERRED EMBODIMENT

Figure 1:
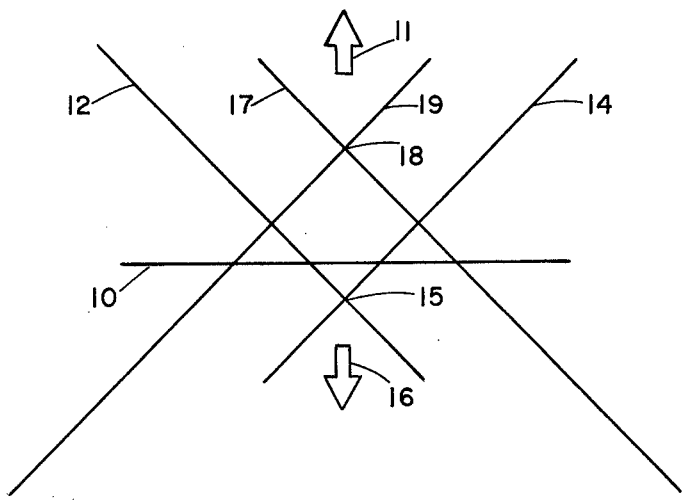
FIG. 1 illustrates a preferred embodiment of the "double X bar" pattern.
Figure 2:
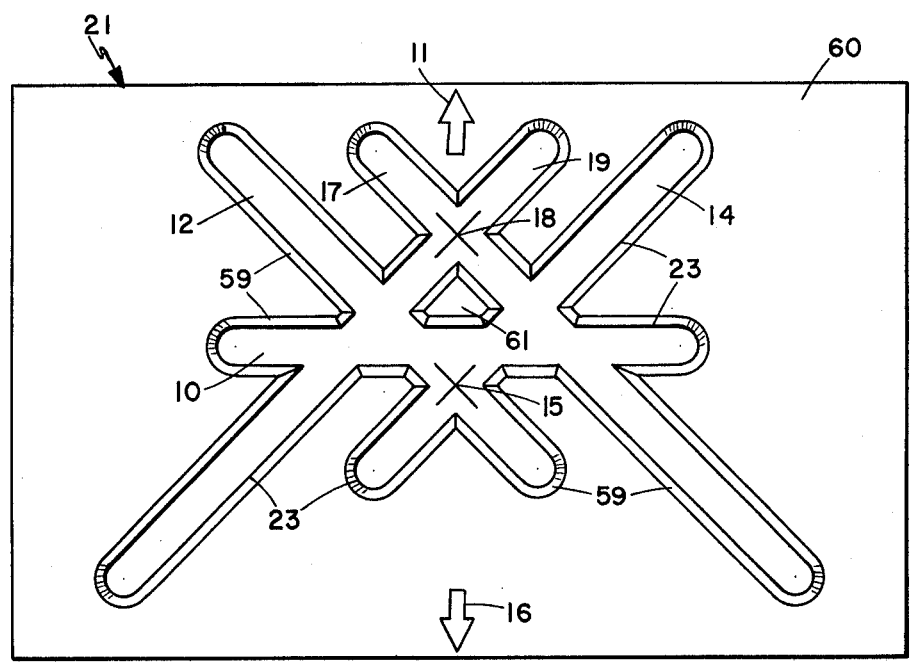
FIG. 2 is a plan view of a panel containing apertures arrayed in a preferred embodiment of the double X bar pattern.

The housing 20 of the double X bar scanner includes a panel 21 positioned within the reference plane. (See FIGS. 2, 4, and 5) The panel 21 has a flat surface containing apertures 23 that are arrayed in a preferred embodiment of the double X bar pattern. Referring to FIG. 2, the first, second and third bars 10, 12, 14 are at least 6 inches (15 centimeters) long, the fourth and fifth bars 17, 19 are at least 8 inches (20 centimeters) long, the distance between the intersection 15 of the second and fifth bars 12, 19 and the intersection 18 of the third and fourth bars 14, 17 is approximately 2 inches (5 centimeters); the distance by which the second and third bars 12, 14 extend past their point of intersection 15 is at least 1½ inches (3¾ centimeters); and the distance by which the fourth and fifth bars 17, 19 extend beyond their point of intersection 18 is at least 1½ inches (3¾ centimeters).

Figure 3:
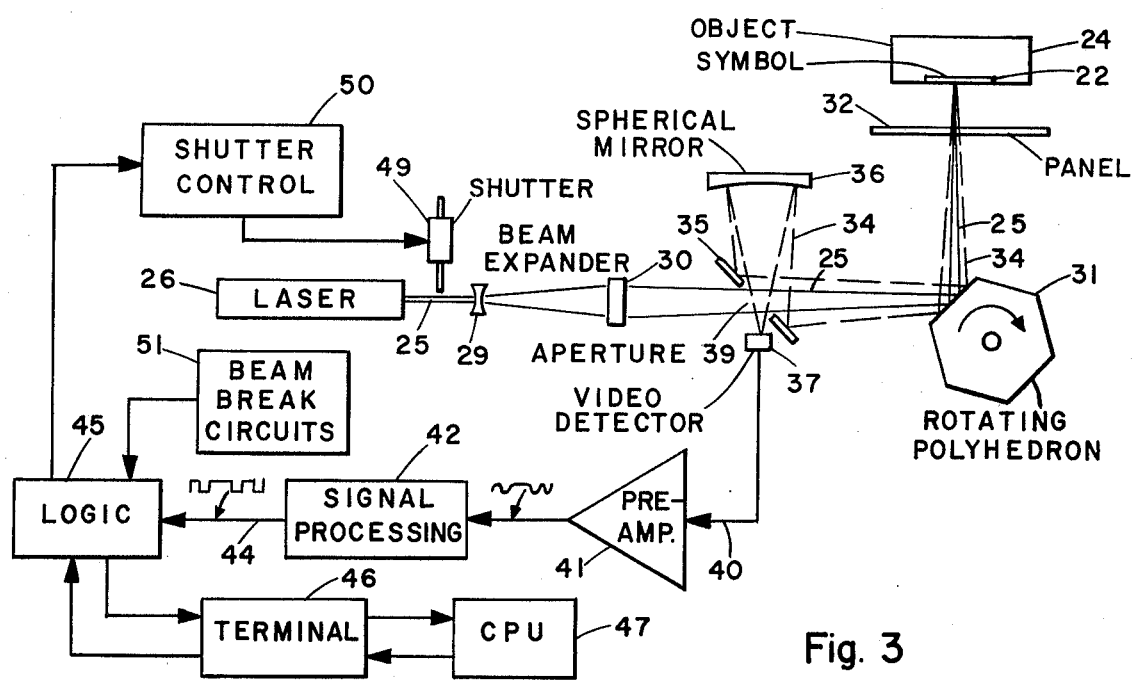
FIG. 3 is a schematic block diagram of the double X bar scanner.

The operation of the double X bar scanner in combination with a data processing system is explained with reference to FIG. 3.

A code symbol 22 on an object 24 is scanned by a light beam 25 provided from a laser 26. The light beam from the laser 26 is expanded by a beam expander 29 and then focused by a focusing element 30 to a spot size that can be controlled over a large depth of field to be small enough to be able to distinguish the size and the spacing of the parallel bars in a UPC code symbol. The focused light beam from the focusing element 30 is reflected from a mirrored surface of a rotating polyhedron 31 to the code symbol 22. As the polyhedron 31 rotates, the light beam 25 is reflected by different sets of mirrors (not shown in FIG. 3) through different ones of the five bars in the surface of a panel 32 that are arrayed in a double X bar pattern.

Diffuse light reflected from the scanned light beam 25 by the code symbol 22 is directed along a path 34 back through the panel 32 to the rotating polyhedron 31, from where it is reflected from a first mirror 35 to a second mirror 36. The first mirror 35 is positioned in a given direction in front of a detection system that includes a video detector 37. The detector 37 is positioned to detect light received from the given direction. The first mirror 35 includes an aperture 39 that enables light to pass through the aperture 39 to the detector 37 from the given direction. The detector 37 detects light having at least a predetermined intensity and provides an electrical signal on line 40 in response to detection of light of at least the predetermined intensity.

The second mirror 36 is spherical for collecting light reflected from the first mirror 35, for concentrating the reflected light into a beam of at least the predetermined intensity for transmission through the aperture 39 in the first mirror 35 to the detector 37, and for focusing an image of the scanned portion of the code symbol 22 to the detector 37.

As the code symbol 22 is scanned by the light beam 25, the detector 37 detects the light reflected back through the panel 32 via the light beam 34 and focused by the spherical second mirror 36 to provide a moving image of the code symbol 22 and provides an electrical signal on line 40 representative of the coded information related to the object 24 provided by the code symbol 22.

The electrical signal on line 40 is conditioned by a preamplifier 41 and a signal processor circuit 42 to provide a shaped digital signal on line 44 representing the spacing of the parallel bars in the coded symbol. The digital signal on line 44 is furnished to a digital logic circuit 45. The digital logic circuit 45 is connected through a data processing terminal 46, and to a CPU (central processing unit) 47. The digital logic circuit 45 includes a microprocessor which converts the symbol encodation information represented by the digital signal on line 44 into a BCD (binary coded decimal) digital signal. The BCD signal is provided to the terminal 46 when the logic circuit 45 verifies that the signal on line 44 represents a valid UPC code symbol. These circuits and their functions in processing signals derived from optically scanned UPC code symbols are well known to those skilled in the data processing art and therefore they are not discussed herein in any greater detail.

A shutter 49 is positioned between the laser 26 and the beam expander 29 for preventing the laser radiation within the defined scanning region from exceeding limits specified by government agencies.

The shutter 49 is controlled by a shutter control circuit 50, which in turn is controlled by the logic circuit 45.

Figure 4:
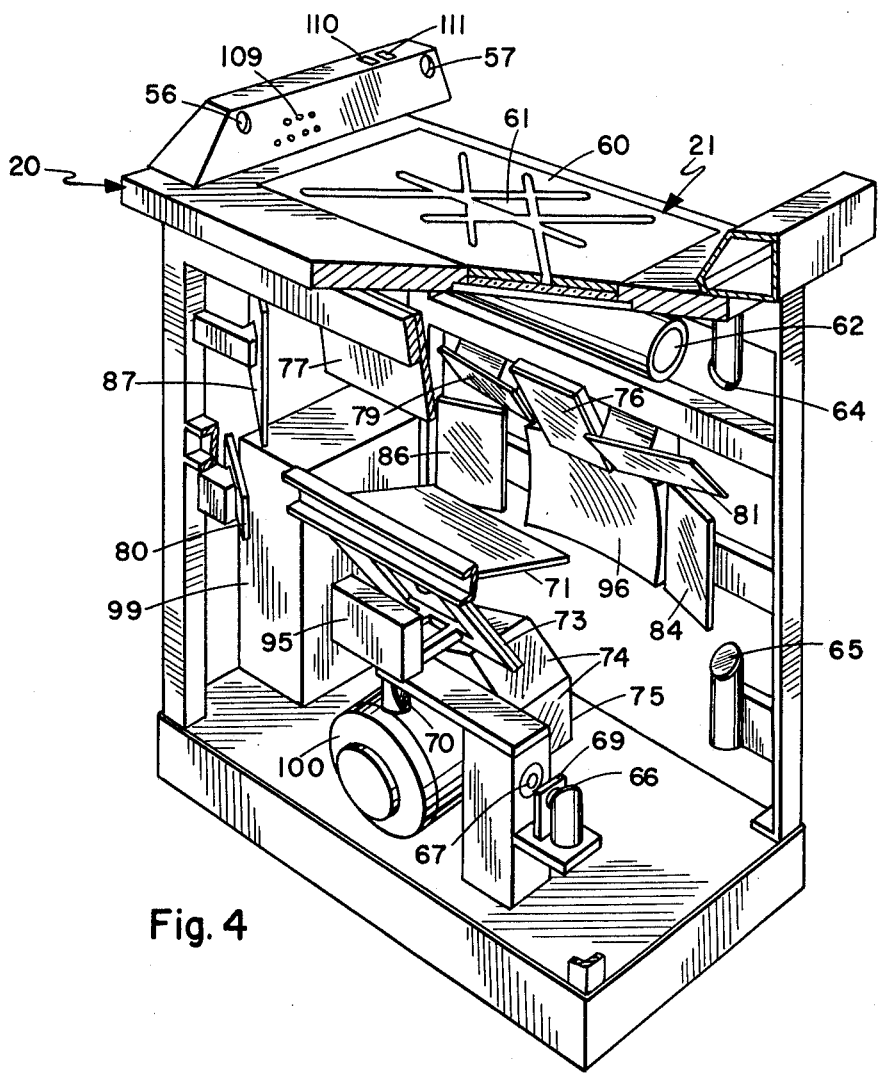
FIG. 4 is a perspective view from one direction of the double X Bar scanner with a portion of the housing cut away to expose certain portions of the optical system.

The control of the shutter control circuit 50 by the logic circuit 45 is in part determined by a beam sensing circuit 51. Two light beams are extended across opposite ends of the defined scanning region. When an object is received in the defined scanning region from the first direction, a first, or front, such light beam is broken, and when the object exits the defined scanning region in the second direction the second, or back, light beam is broken. These beams are provided from LED's 54, and 55 (FIG. 5) and are detected by phototransistors 56 and 57 (FIG. 4). The LED's and phototransistors are included in the beam sensing circuit 51.

When the phototransistors for detecting the light beams detect that the respective light beams are broken, appropriate signals are provided by the beam sensing circuit 51 to the logic circuit 45.

When the front beam is broken the logic circuit 45 causes the shutter control circuit 50 to open the shutter 49. When the back light beam is broken, or when the integrity of a detected code symbol is verified, or two seconds after the front beam is broken, whichever occurs first, the logic circuit 45 causes the shutter control circuit 50 to close the shutter 49.

The apparatus for providing and scanning the light beam is illustrated in FIGS. 4 and 5.

A panel 21 having a generally flat horizontal surface defines the scanning region in which objects bearing code symbols are received as the region above the double X bar pattern in the panel 21, as shown in FIGS. 2, 4, and 5. The panel includes a metal plate overlaying and adhered to a glass plate. There are light transmissive apertures 23 in the metal plate for defining the double X bar pattern. The edges 59 of these apertures 23 are inclined to prevent objects being moved through the defined scanning region from catching on the edges of the apertures 23. The metal plate consists of two pieces 60 and 61. The underlying glass plate is one continuous piece. The metal plates 60, 61 are approximately one-quarter inch (0.6 cm) thick and the apertures 23 in the plates 60, 61 defining the bars, 10, 12, 14, 17, 19, are approximately one half inch (1.3 cm) thick. This combination of dimensions prevents the glass plate from being scratched by packages that are scraped over the panel surface.

The light beam is provided by a laser 62 and directed by a series of mirrors 64, 65, and 66 to a beam expander an d focusing unit 67. A shutter and filter attenuator 69 is positioned between the mirror 66 and the beam expander and focusing unit 67. The shutter is operated as explained above with reference to FIG. 3.

A focused light beam from the beam expander and focusing unit 67 is reflected by a mirror 70, through an aperture 72 in a mirror 73 to a mirror 71 and then to a mirrored surface 74 of a rotatable polyhedron 75.

The optical system for scanning the light beam in the variously oriented planes that extend throughout the defined scanning region includes the polyhedron 75 and separate sets of mirrors for scanning the light beam through each of the five bars 10, 12, 14, 17, 19 arrayed in the double X bar scanning pattern. The polyhedron 75 includes six mirrored flat surfaces 74 as shown in the Drawing, all of which are parallel to the axis of rotation of the polyhedron 75. As the polyhedron 75 rotates the light beam from the laser 62 is reflected from a mirrored surface 74 of the polyhedron 75 to one of the different sets of mirrors.

These sets of mirrors are as follows. Mirrors 76 and 77 direct the light beam through the first bar 10. Mirrors 79 and 80 direct the light beam through the second bar 12. Mirrors 81 and 82 direct the light beam through the third bar 14. Mirrors 84 and 85 direct the light beam through the fourth bar 17. Mirrors 86 and 87 direct the light beam through the fifth bar 19.

Figure 8:
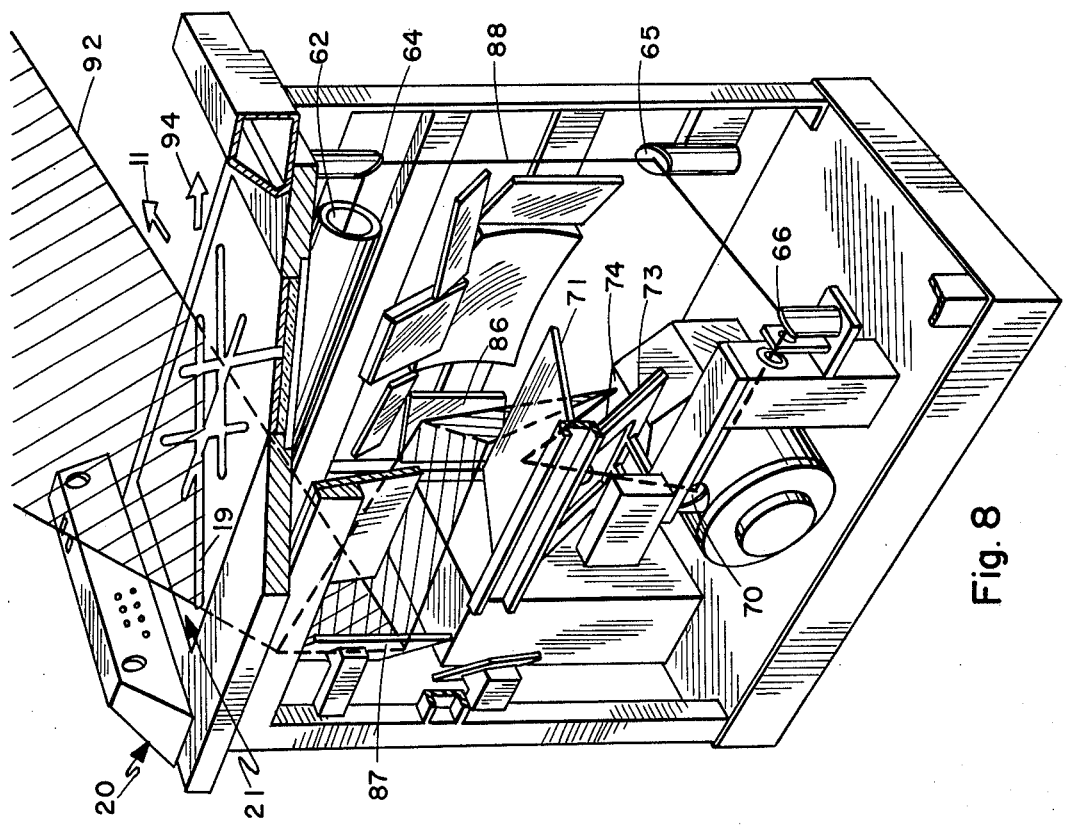
FIG. 8 is a view of the scanner as shown in FIG. 3 and additionally showing the optical path of the light beam scanned in a plane extending through the fifth bar into the defined scanning region.
Figure 7:
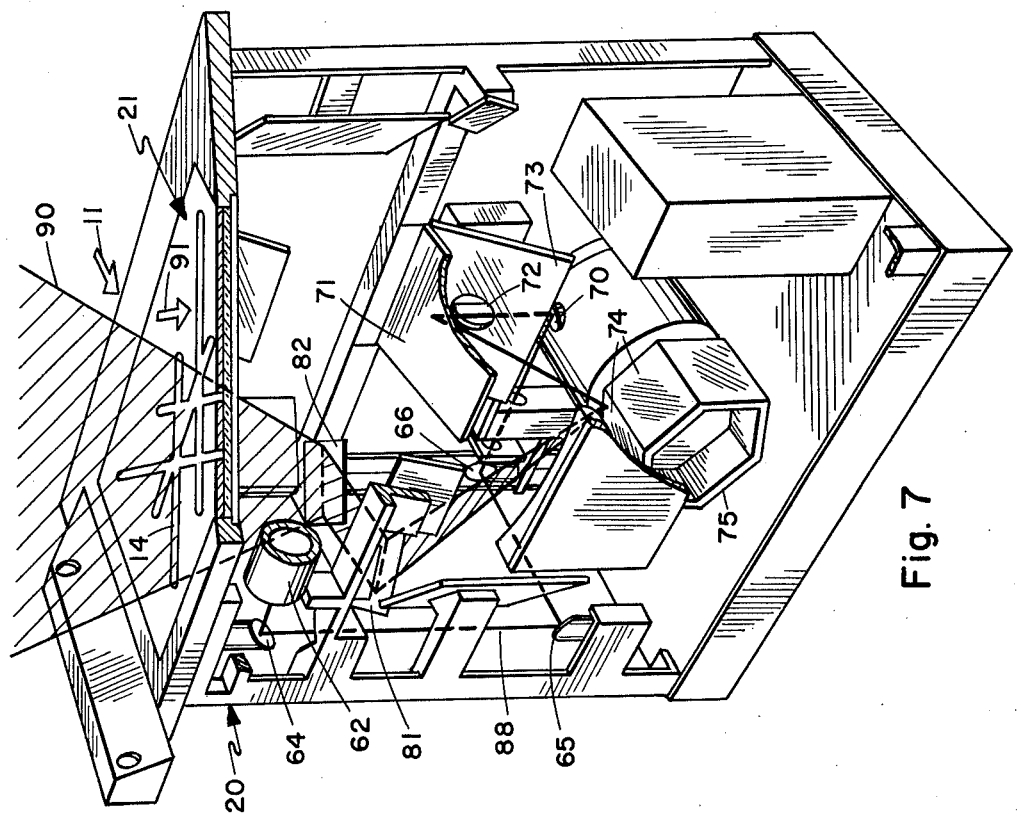
FIG. 7 is a view of the scanner as shown in FIG. 4 and additionally showing the optical path of the light beam scanned in a plane extending through the third bar into the defined scanning region.

The different paths of the light beam are illustrated in FIGS. 6, 7, and 8.

Referring to FIG. 6, the light beam 88 from the laser 62 is directed by mirrors 64, 65, 66, 70, and 71 to a mirrored surface 74 of the polyhedron 75. As the polyhedron 75 rotates the light beam 88 is reflected by mirrors 76 and 77 in a pattern that fans out to define the first plane 89 that extends through the first bar 10 into the defined scanning region above the panel 21. The first plane 89 extends through the first bar 10 at an acute angle of approximately 45° to the flat horizontal surface of the panel 21 in the first direction 11.

Referring to FIG. 7, as the polyhedron 75 rotates the beam 88 is reflected by mirrors 81 and 82 in a pattern that fans out to define the third plane 90 that extends through the third bar 14 into the defined scanning region. The third plane 90 extends through the third bar 14 at an acute angle of approximately 55° to the surface of the panel 21 in a direction 91 that is at an acute angle of 45° to the first direction 11.

The second plane scanned through the second bar 12 by the rotating polyhedron 75 and mirrors 79 and 80 is symmetrical to the third plane 90 with respect to the first bar 10 and the surface of the panel 21.

Referring to FIG. 8, as the polyhedron 75 rotates, the beam 88 is reflected by mirrors 86 and 87 in a pattern that fans out to define the fifth plane 92 that extends through the fifth bar 19 into the defined scanning region. The plane 92 extends through the bar 19 normal to the surface of panel 21 and in a direction 94 that is at an acute angle to the direction 11. The scanning angle of the light beam in the fifth plane 92 with respect to the surface of the panel 21 varies from approximately 32° to approximately 47°.

The fourth plane scanned through the fourth bar 17 by the rotating polyhedron 75 and mirrors 84 and 85 is symmetrical to the fifth plane 92 with respect to the first bar 10 and the surface of the panel 21.

The apparatus shown in FIGS. 4 and 5 further includes a video detector 95 which detects light having at least a predetermined intensity, and provides an electrical signal in response to the detection of such light.

The system for directing light to the detector 95 from the scanned light beam 79 that is reflected from a code symbol on an object received in the defined scanning region includes the various sets of mirrors 76, 77, 79, 80, 81, 82, 84, 85, 86, and 87 which direct the beam 88 through the bars 10, 12, 14, 17, 19 in the panel 21, the mirrored surfaces 74 of the polyhedron 75, mirror 71, mirror 73 and a spherical mirror 96. Diffuse reflected light from the code symbol, that is directed back to the polyhedron 75 is further reflected to mirror 71, to mirror 73 and to the spherical mirror 96. The spherical mirror 96 is positioned in a given position from the detector 95. The mirror 73 is positioned between the detector 95 and the spherical mirror 96, but includes an aperture 72 which enables a concentrated light beam from the spherical mirror 96 to pass through to the detector 95. The spherical mirror 96 collects the light reflected from the mirror 73 and concentrates the reflected light into a beam of at least the predetermined intensity which is reflected by the spherical mirror 96 through the aperture 72 to the detector 95. The spherical mirror 96 also focuses an image of the scanned portion of the code symbol to the detector 95.

The apparatus shown in FIGS. 4 and 5 also includes a power supply 99 for the laser 62, and a motor 100 for driving the polyhedron 75.

The laser is a continuous wave HeNe laser which provides a 1 milliwatt colinear coherent light beam having a diameter of approximately 0.5 mm and a wavelength of 632.8 nanometers, which is in the red portion of the spectrum. In accordance with the present state of the art, a laser beam can be focused to spots small enough for scanning and distinguishing the smallest bars in UPC code symbols. Such bars are approximately 0.008 inches (0.2 mm) wide.

The mirrors in the apparatus shown in FIGS. 4 and 5 are high efficiency dielectric mirrors.

The motor 100 rotates the polyhedron 75 at about 98 percent of 3600 revolutions per minute.

The polyhedron 75 has six mirrored surfaces 74 so as to attain a sufficiently high repetition rate of scanning. A high repetition rate is required to allow packages to be moved through the defined scanning region at speeds that do not impede the clerk's use of the double X bar scanner.

The shutter 69 can be opened fast enough to allow scanning of code symbols at the rate of about 100 inches per second (250 cm/sec).

A high scanning speed and repetition rate enables multiple scans to be made while the code symbol is passing through the defined scanning region, and in effect, the scanner is less sensitive to voids, smears or dirt on the code symbols.

The double X bar scanner is multidirectional, meaning that it automatically reads code symbols on the sides or bottoms of differently shaped packages, including those with flat, tilted, or curved surfaces bearing the code symbol.

Figure 9:
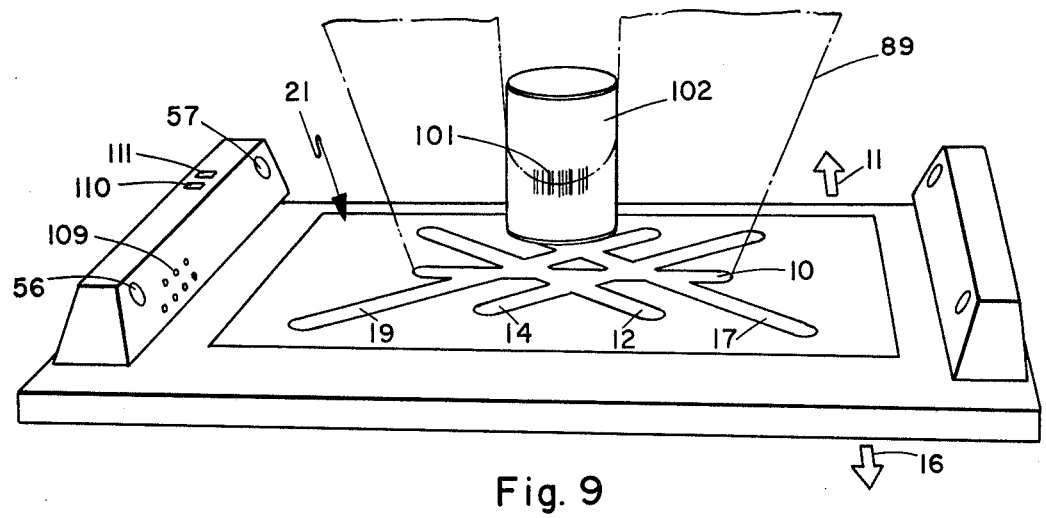
FIG. 9 is a perspective view illustrating how a code symbol on the side of a package is scanned by a light beam scanned in a plane extending through the first bar into the defined scanning region.
Figure 10:
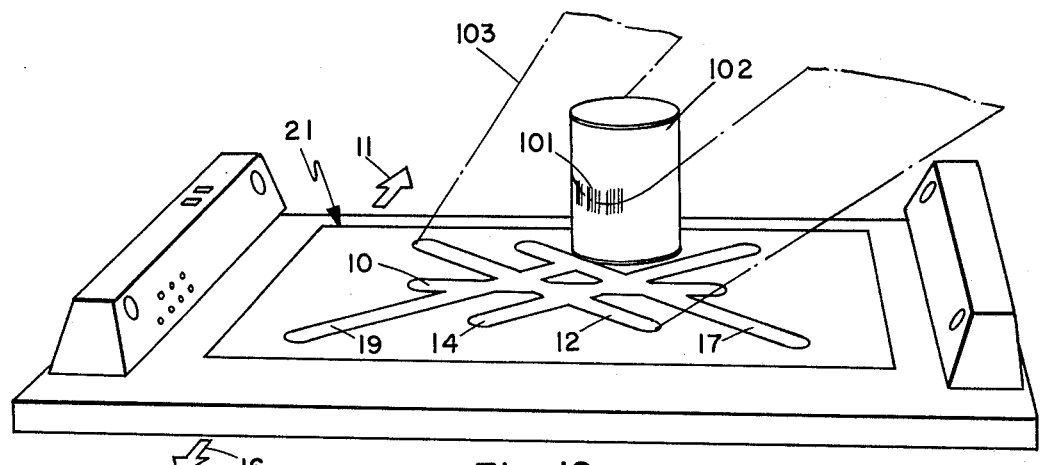
FIG. 10 is a perspective view illustrating how a code symbol having vertically spaced bars on the side of an upright package is scanned by a light beam scanned in a plane extending through the second bar into the defined scanning region.
Figure 11:
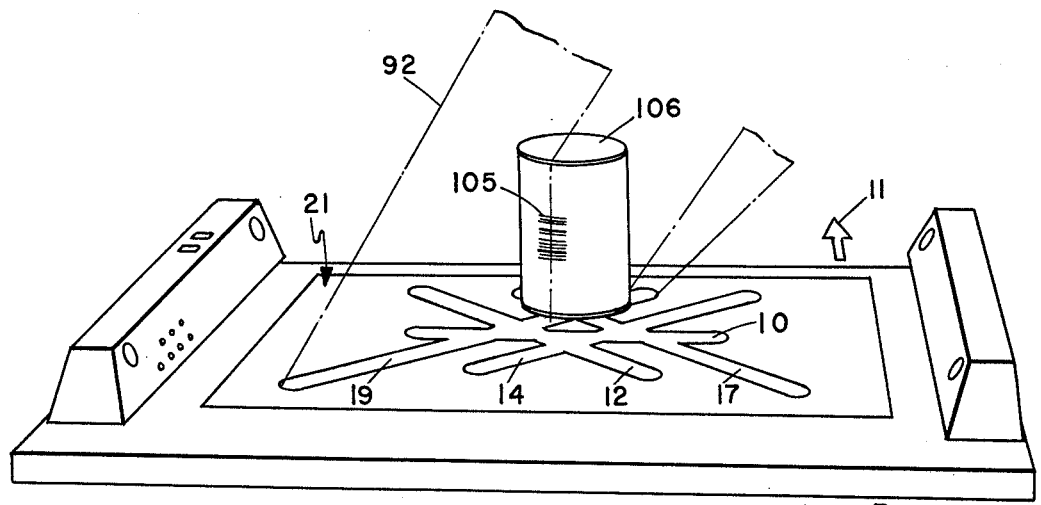
FIG. 11 is a perspective view illustrating how a code symbol having horizontally spaced bars on the side of an upright package is scanned by a light beam scanned in a plane extending through the fifth bar into the defined scanning region.

FIGS. 9, 10, and 11 illustrate how a code symbol on the curved side surface of a can is scanned by the light beam being scanned in the variously oriented planes extending through the bars 10, 12, 14, 17, and 19 in the panel 21 defining the double X bar scanning pattern.

Referring to FIG. 9, the light beam in the first plane 89 extending through the first bar 10 in the panel 21 scans a code symbol 101 having vertical bars positioned on the side of an upright can 102 received in the defined scanning region from the first direction 11.

Referring to FIG. 10, the light beam in the second plane 103 extending through the second bar 12 in the panel 21 scans a code symbol 101 having vertical bars positioned on the side of an upright can 102 received in the defined scanning region from the first direction 11.

Referring to FIG. 11, the light beam in the fifth plane 92 extending through the fifth bar 19 in the panel 21 scans a code symbol 105 having horizontal bars positioned on the side of an upright can 106 received in the defined scanning region from the first direction 11.

With respect to FIGS. 9, 10, and 11, if the can 102 in FIGS. 9 and 10 is tilted more than 45° from an upright orientation, the code symbol 101 will be accurately scanned by the light beam in either the fourth plane or the fifth plane 92, as shown in FIG. 11. Likewise if the can 106 in FIG. 11 is tilted more than 45° from an upright orientation, the code symbol 105 will be accurately scanned by the light beam in the first plane 89, the second plane 103, or the third plane 90.

Thus it is seen from FIGS. 9, 10, and 11, that the code symbol on the side of a package will be scanned by a light beam within one of the five scanning planes whenever the code symbol faces within 90° of the second direction 16.

A code symbol positioned on the bottom of a package received in the defined scanning region from the first direction will be accurately scanned by the light beam in one or more of the planes of light extending through the five bars, 10, 12, 14, 17, 19, notwithstanding how the package is oriented with respect to the second direction 16.

The apparatus shown in FIGS. 4 and 5 further includes a speaker 109 and green and red indicator lights 110 and 111 for indicating to the clerk whether an accurate scan of the code symbol has been made by the double X bar scanner. The speaker 109 and the lights 110, 111 are controlled by the logic circuit 45. The speaker 109 provides a short tone and the green light 110 is illuminated, when the logic circuit 45 verifies that an accurate scan has been made of the code symbol. The speaker 109 provides a long tone and the red light 111 is illuminated when the logic circuit 45 determines that the scan of the code symbol was inaccurate.

Having described my invention, I now claim:

1. A system for scanning a code symbol consisting of a combination of spaced parallel bars affixed to an object for providing coded information related to said object, and for providing an electrical signal indicative of said coded information in response to scanning said code symbol, comprising a housing for defining a scanning region adjacent the housing for receiving objects having said code symbol;

means for providing a light beam;

means for scanning said light beam in a predetermined scanning pattern within said defined scanning region;

means for detecting light having at least a predetermined intensity and for providing an electrical signal in response to detection of said light; and means for directing light from said scanned light beam that is reflected from a said code symbol on a said received object to the detecting means; characterized by the scanning means including an optical system for scanning said light beam at an acute angle to a reference plane defining a boundary of said defined scanning region and in a predetermined scanning pattern that includes a first bar in said reference plane extending normal to a first direction;

second and third bars in said reference plane disposed along lines that intersect with each other and disposed symmetrically in relation to the first bar; and fourth and fifth bars in said reference plane disposed along lines that intersect with each other and disposed symmetrically in relation to the first bar;

wherein the second and third bars intersect with each other and/or the fourth and fifth bars intersect with each other; and wherein the second bar intersects with the fifth bar and the third bar intersects with the fourth bar; and said pattern further includes a first plane extending through the first bar into said defined scanning region at an acute angle to said reference plane in said first direction, a second plane extending through the second bar into said defined scanning region at an acute angle to the reference plane at an acute angle to said first direction, a third plane extending through the third bar into said defined scanning region at an acute angle to said reference plane and at an acute angle to said first direction, a fourth plane extending through the fourth bar into said defined scanning region normal to said reference plane and at an acute angle to said first direction, and a fifth plane extending through the fifth bar into said defined scanning region normal to said reference plane and at an acute angle to said first direction, whereby when a said received object containing a said code symbol is moved within said defined scanning region from said first direction with said code symbol facing said reference plane or facing opposite said first direction, light scanned into said defined scanning region by the scanning means is reflected by said code symbol to the detecting means, and the detecting means provides an electrical signal indicative of said coded information.

2. A system according to claim 1, wherein said acute angle to said first direction at which the second, third, fourth and fifth planes respectively extend is approximately 45°.

3. A system according to claim 1, wherein said acute angle to said reference plane at which the first plane extends is 45° plus or minum 15°.

4. A system according to claim 1, wherein said acute angle to said reference plane at which the second and third planes extend is 45° plus or minus 15°.

5. A system according to claim 1, wherein said acute angle to said reference plane at which said light beam is scanned in the fourth and fifth planes is 45° plus or minus 15°.

6. A system according to claim 1, wherein said acute angle to said reference plane at which the first plane extends is 45° plus or minus 15°;
wherein said acute angle to said reference plane at which the second and third planes extend is 45° plus or minus 15°; and
wherein said acute angle to said reference plane at which said light beam is scanned in the fourth and fifth planes is 45° plus or minus 15°.

7. A system according to claim 6, wherein said acute angle to said first direction at which the second, third, fourth and fifth planes respectively extend is approximately 45°.

8. A system according to claim 7, wherein said point of intersection between the second and third bars is in a second direction opposite said first direction from the first bar; and/or
said point of intersection between the fourth and fifth bars is in said first direction from the first bar.

9. A system according to claim 8, wherein the first bar intersects with the second, third, fourth and fifth bars.

10. A system according to claim 9, wherein the ends of the second, third fourth and fifth bars in said first direction from the first bar are approximately equidistant in said first direction from a straight line extending along and beyond the length of the first bar and the ends of the fourth and fifth bars in said second direction from the first bar are approximately twice the distance in the second direction from said straight line as the ends of the second and third bars in said second direction from said straight line.

11. A system according to claim 10, wherein the first, second, and third bars are at least 6 inches (15 centimeters) long, the fourth and fifth bars are at least 8 inches (20 centimeters) long, the distance between the intersection of the second and fifth bars and the intersection of the third and fourth bars is approximately 2 inches (5 centimeters); and the distance by which the second and third bars extend past their point of intersection is at least 1½ inches (3¾ centimeters) and/or the distance by which the fourth and fifth bars extend beyond their point of intersection is at least 1½ inches (3¾ centimeters).

12. A system according to claim 1, wherein said acute angle to said first direction at which the second, third, fourth and fifth planes respectively extend is approximately 45°; and wherein said point of intersection between the second and third bars is in a second direction opposite said first direction from the first bar; and/or
said point of intersection between the fourth and fifth bars is in said first direction from the first bar.

13. A system according to claim 12, wherein the first bar intersects with the second, third, fourth and fifth bars.

14. A system according to claim 13, wherein the ends of the second, third fourth and fifth bars in said first direction from the first bar are approximately equidistant in said first direction from a straight line extending along and beyond the length of the first bar and the ends of the fourth and fifth bars in said second direction from the first bar are approximately twice the distance in the second direction from said straight line as the ends of the second and third bars in said second direction from said straight line.

15. A system according to claim 14, wherein the first, second and third bars are at least 6 inches (15 centimeters) long, the fourth and fifth bars are at least 8 inches (20 centimeters) long, the distance between the intersection of the second and fifth bars and the intersection of the third and fourth bars is approximately 2 inches (5 centimeters); and the distance by which the second and third bars extend past their point of intersection is at least 1½ inches (3¾ centimeters) and/or the distance by which the fourth and fifth bars extend beyond their point of intersection is at least 1½ inches (3¾ centimeters).

16. A system for scanning a code symbol consisting of a combination of spaced parallel bars affixed to an object for providing coded information related to said object, and for providing an electrical signal indicative of said coded information in response to scanning said code symbol, comprising
a panel for defining a scanning region adjacent the panel for receiving objects having said code symbol;
means for providing a light beam;
means for scanning said light beam in a predetermined pattern throughout said defined scanning region;
means for detecting light having at least a predetermined intensity and for providing an electrical signal in response to detection of said light; and
means for directing light from said scanned light beam that is reflected from a said code symbol on a said received object to said detecting means; characterized by
the panel having a surface containing light transmissive areas defining a pattern including
a first bar extending normal to a first direction;
second and third bars intersecting with each other and with the first bar and disposed symmetrically in relation to the first bar with the point of intersection with each other being in a second direction opposite the first direction from the first bar; and
fourth and fifth bars intersecting with each other and with the first bar and disposed symmetrically in relation to the first bar with the point of intersection with each other being in the first direction from the first bar;
wherein the second bar intersects with the fifth bar and the third bar intersects with the fourth bar; and by the scanning means including an optical system for scanning the light beam at an acute angle to the panel surface and in a said predetermined scanning pattern that includes a first plane extending through the first bar into said defined scanning region at an acute angle to the panel surface in said first direction, a second plane extending through the second bar into said defined scanning region at an acute angle to the panel surface and at an acute angle to said first direction, a third plane extending through the third bar into said defined scanning region at an acute angle to the panel surface and at an acute angle to said first direction, a fourth plane extending through the fourth bar into said defined scanning region normal to the panel surface and at an acute angle to said first direction, and a fifth plane extending through the fifth bar into said defined scanning region normal to the panel surface and at an acute angle to said first direction;

whereby when a said received object containing a said code symbol is moved within said defined scanning region from said first direction with said code symbol facing the panel or facing said second direction, light scanned into said defined scanning region by the scanning means is reflected by said code symbol to the detecting means, and the detecting means provides an electrical signal indicative of said coded information.

17. A system according to claim 16, wherein said acute angle to the panel surface at which the first plane extends is 45° plus or minus 15°;

wherein said acute angle to the panel surface at which the second and third planes extend is 45° plus or minus 15°; and wherein said acute angle to the panel surface at which said light beam is scanned in the fourth and fifth planes is 45° plus or minus 15°.

18. A system according to claim 17, wherein said acute angle to said first direction at which the second, third, fourth and fifth planes respectively extend is approximately 45°.

19. A system according to claim 18, wherein the ends of the second, third, fourth and fifth bars in said first direction from the first bar are approximately equidistant in said first direction from a straight line extending along and beyond the length of the first bar and the ends of the fourth and fifth bars in said second direction from the first bar are approximately twice the distance in the second direction from said straight line as the ends of the second and third bars in said second direction from said straight line.

20. A system according to claim 19, wherein the first, second and third bars are at least 6 inches (15 centimeters) long, the fourth and fifth bars are at least 8 inches (20 centimeters) long, the distance between the intersection of the second and fifth bars and the intersection of the third and fourth bars is approximately 2 inches (5 centimeters); and the distance by which the second and third bars extend past their point of intersection is at least 1½ inches (3¾ centimeters) and/or the distance by which the fourth and fifth bars extend beyond their point of intersection is at least 1½ inches (3¾ centimeters).

21. A system according to claim 16, wherein said acute angle to said first direction at which the second, third, fourth and fifth planes respectively extend is approximately 45°.

22. A system according to claim 21, wherein the ends of the second, third, fourth and fifth bars in said first direction from the first bar are approximately equidistant in said first direction from a straight line extending along and beyond the length of the first bar and the ends of the fourth and fifth bars in said second direction from the first bar are approximately twice the distance in the second direction from said straight line as the ends of the second and third bars in said second direction from said straight line.

23. A system according to claim 22, wherein the first, second and third bars are at least 6 inches (15 centimeters) long, the fourth and fifth bars are at least 8 inches (20 centimeters) long, the distance between the intersection of the second and fifth bars and the intersection of the third and fourth bars is approximately 2 inches (5 centimeters); and the distance by which the second and third bars extend past their point of intersection is at least 1½ inches (3¾ centimeters) and/or the distance by which the fourth and fifth bars extend beyond their point of intersection is at least 1½ inches (3¾ centimeters).

* * * * *